United States Patent Office 2,996,449
Patented Aug. 15, 1961

2,996,449
GLUCOSE-AMINE SEQUESTRANTS
John E. Hodge and Ben F. Moy, Peoria, Ill., assignors to the United States of America as represented by the Secretary of Agriculture
No Drawing. Filed June 29, 1960, Ser. No. 39,736
2 Claims. (Cl. 210—58)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

In its major aspects this invention relates to polyvalent metal ion sequestering and water-softening agents and to compositions comprising the same. This invention further relates to the novel method of sequestering such metal ions as calcium, copper, iron, and zinc by complexing them with one or a mixture of several specific compounds, one of which compounds is new while several of them are known compounds but are novel agents for the purpose of this invention. This invention also pertains to an improved method for preparing the mixture of known mono- and diglucosylamines so that the more useful diglucosylamine is formed in a distinctly major proportion rather than in minor proportion as in the prior art.

It is known that a solution comprising 53–69 percent of theory of the primary amine, D-glucosylamine (Formula I), can be formed by heating glucose with excess ammonia under at least 100 lbs. per sq. inch pressure (Klug, U.S. 2,197,540). It is reported that the Amadori rearrangement product (1-amino-1-deoxy-D-fructose) (Formula II) of isolated D-glucosylamine (Formula I) can be formed by heating D-glucosylamine in acetic acid or in a mixture of dimethyl sulfoxide and diethyl malonate to give the 1-amino-1-deoxy-D-fructose (II). The isolation of a crystallizable salt such as the acetate of the Amadori rearrangement product of di-D-glucosylamine (Formula IV) has, however, never been reported. The structural formulas of the basic compounds of and employed in our invention appear below.

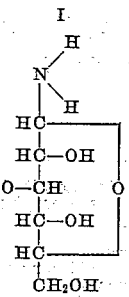

D-glucosylamine or (1-amino-1-deoxy-D-glucopyranose)

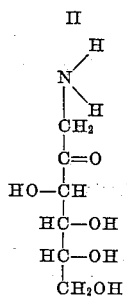

1-amino-1-deoxy-D-fructose
(Amadori rearrangement product of I)

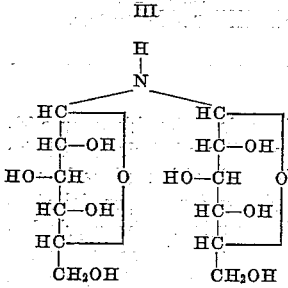

Di-D-glucosylamine or imino-bis(1-deoxy-D-glucopyranose)

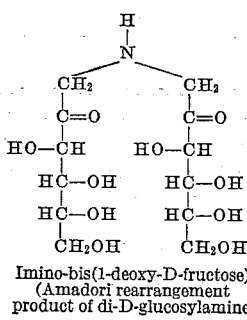

Imino-bis(1-deoxy-D-fructose)
(Amadori rearrangement product of di-D-glucosylamine)

In the prior art glucose has been heated in liquid ammonia or in methanolic ammonia in the presence of an acidic catalyst and under a maintained ammonia pressure of at least 100 p.s.i., thus forming chiefly the primary amine (I), 1-amino-1-deoxy-D-glucose (also called 1-amino-1-deoxy-D-glucopyranose) (60 percent) and only an undetected minor proportion of the secondary amine (III), di-D-glucosylamine. We have discovered that by adding an inert drying agent such as anhydrous calcium sulfate, magnesium sulfate, sodium sulfate, or calcined lime and by conducting the entire reaction at atmospheric pressure, first at below 40° C. and then at about 60–70° C., the water of condensation is immobilized thus promoting a substantial removal of ammonia from the reaction solution, which apparently shifts the equilibrium toward the more useful di-D-glucosylamine. The use of a water-binding or drying agent provides the additional benefit of minimizing sugar decomposition reactions in the prolonged reaction, especially in the presence of an acidic condensation catalyst such as ammonium chloride, ammonium bromide, ammonium nitrate, or ammonium thiocyanate, all of which catalysts we have found to be effective promoters for the reaction.

We have also prepared and isolated as the crystalline acetate salt the hitherto unreported Amadori rearrangement product of di-D-glucosylamine, namely imino-bis-(1-deoxy-D-fructose) $[\alpha]_D^{25}$ —68° in water, which we prepared by heating di-α-D-glucosylamine in glacial acetic acid. The substantially pure acetate salt could be obtained in a continuous commercial process at atmospheric pressure comprising the steps of first warming glucose dissolved in methanolic ammonia or dimethylformamide-ammonia solution or liquid ammonia in the presence of an acidic catalyst and a water-binding agent for 1 to 4 hours at below 40° C., then continuing heating for 1–4 hours at 60–70° C., removing the solvent and/or reaction liquid for evaporation and recycle, dissolving the dry residue in glacial acetic acid, letting stand at room temperature or with mild heating for 3 to 6 hours, and separating the acetate salt crystals of imino-bis(1-deoxy-D-fructose) which form upon adding ethanol, ether, or preferably, ethyl acetate.

Most importantly we have discovered that in neutral and especially in alkaline solution di-D-glucosylamine and particularly the acetate salt of imino-bis(1-deoxy-D-fructose), are effective chelating agents for polyvalent metallic ions such as calcium, magnesium, strontium, copper, nickel, zinc, aluminum, iron, and cobalt. The many uses of chelating or sequestering agents in industry, in water-softening, and even in medicine are well known and require no elaboration.

Although Examples 8–12 show that under certain conditions imino-bis(1-deoxy-D-fructose) is a better sequestering agent than either its nonrearranged parent compound, namely 1-amino-1-deoxy-D-fructose (obtained and employed as the acetate salt), this invention contemplates the sequestrant use of any of the isolated parent compounds or their Amadori rearrangement product acetate salts, and it also contemplates the employment of crude or partial mixtures thereof in concentrated solution or in dry form.

Thus, the objects of our invention include an improved process for reacting a reducing sugar with ammonia to form a predominance of the secondary amine product rather than of the primary amine, and the preparation of a novel crystalline Amadori rearrangement product of di-D-glucosylamine. A further object of this invention is the method of chelating metal ions and of softening calcium-containing water by adding the above compounds thereto.

The following examples further teach the preparation of our novel compounds and also indicate their effective employment as polyvalent metal ion sequestering or chelating agents.

Example 1

One mole of anhydrous glucose (180 g.) and 0.5 mole of ammonium chloride (27 g.) were stirred into 500 ml. of chilled liquid ammonia; then 200 g. anhydrous calcium sulfate was added. The cooling bath was removed and the mixture stirred continuously over 2 hours while much of the ammonia distilled out. Methanol (300 ml.) was added, and the mixture was heated in a water bath held at 40° C. for 4 hours and in a bath at 70° C. for 1 hour to further remove ammonia. The reaction mixture was diluted with methanol (400 ml.), filtered to remove calcium sulfate, and then the filtrate was evaporated to dryness in vacuo to give a mixture of the hydrochloride salts of di-D-glucosylamine (62% of theory) and 1-amino-1-deoxy-D-glucose (D-glucosylamine), (27% of theory). The yields were determined by acetylation of the dried residue in pyridine-acetic anhydride at 25° C. Upon pouring the acetylated mixture into ice water, 211 g. (62% of theory) of crystalline diglucosylamine octaacetate melting at 208–210° C. was isolated. The recrystallized compound was unequivocally identified as α-diglucosylamine octaacetate by melting point (210–211° C.), specific optical rotation (+89° in chloroform), and analysis. Calculated for $C_{28}H_{39}N_{18}$: 49.6% C, 5.80% H, 2.07% N. Found: 49.9 C, 5.84% H, 2.05% N. The mother liquor from the diglucosylamine octaacetate crystallization was exhaustively extracted with chloroform. Evaporation of the dried chloroform extracts, followed by dilution of the sirupy residue with ether gave 105 g. of nearly pure 1-amino-1-deoxy-D-glucose pentaacetate, 27% of theory, melting at 154–155° C. Recrystallization gave the pure compound melting at 159–160° C. Upon admixing with an authentic sample of 1-amino-1-deoxy-D-glucose pentaacetate the melting point was not lowered.

Example 2

The procedure given in Example 1 was repeated with the addition of 1 mole (98 g.) of ammonium bromide instead of 0.5 mole of ammonium chloride. Acetylation of the reaction mixture gave 170 g. of crystalline di-α-D-glucosylamine octaacetate, equivalent to a 50% yield of di-α-D-glucosylamine.

Example 3

The procedure given in Example 1 was repeated with the addition of ammonium nitrate, instead of ammonium chloride. The yield of di-D-glucosylamine was 48% of theory, calculated from the 164 g. yield of crystalline di-α-D-glucosylamine octaacetate.

Example 4

One mole of anhydrous glucose (180 g.), 0.5 mole of ammonium chloride (27 g.), and 200 g. of anhydrous calcium sulfate were stirred for 1 hour at 25° C. in 800 ml. of ammoniacal methanol (21 percent ammonia by weight). The mixture was then refluxed at atmospheric pressure with stirring at temperatures progressively increasing from 25° to 67° C. during 5 hours. Following evaporation and acetylation of the residue in pyridine-acetic anhydride, the yield of diglucosylamine octaacetate was 160 g., 47 percent of theory.

Example 5

Di-α-D-glucosylamine octaacetate (200 g.) was allowed to stand in 2.6 liters of ammoniacal methanol (24 percent ammonia by weight) for 2 days. Partial evaporation of the solvent gave 86 g. of crude di-α-D-glucosylamine (85 percent of theory) as a crystalline precipitate, melting point 157° with decomposition. Extraction with 2.5 liters of hot methanol gave 66 g. (66 percent of theory) of pure di-α-D-glucosylamine, melting point 165° with decomposition; $[\alpha]_D^{25}$ +88° (6 minutes, c.=1.8, in water). Calculated for $C_{12}H_{23}NO_{10}$: 42.24% C, 6.79% H, 4.10% N. Found: 42.06% C, 6.79% H, 4.06% N.

Example 6

Di-α-D-glucosylamine (8.7 g.) was dissolved in 400 ml. glacial acetic acid at 70° C. in about 90 minutes. The acetic acid was distilled off under vacuum, then the residue was dissolved in 250 ml. hot methanol. Addition of an equal volume of ethyl acetate followed by cooling caused crystallization of crude acetate salt of imino-bis(1-deoxy-D-fructose) (6.7 g.). This was recrystallized from methanol-ethanol to yield a purer acetate salt, 2.6 g. (27 percent of theory), melting point 110–114° C. with decomposition: $[\alpha]_D^{25}$ −68° (c.=1.0, in water). Calculated for $C_{14}H_{27}NO_{12}$: 41.88% C, 6.78% H, 3.49% N. Found: 41.71% C, 6.82% H, 3.67% N.

The free base, imino-bis(1-deoxy-D-fructose), was obtained by repeated recrystallization of the acetate salt from methanol, or by making a methanol solution of the acetate salt alkaline before adding ethanol.

Imino-bis(1-deoxy-D-fructose) reduced Fehling solution in the cold as well as both 2,6-dichlorophenolindophenol and o-dinitrobenzene immediately in dilute sodium hydroxide solution at 25° C., in contrast to di-α-D-glucosylamine which did not reduce these reagents under the same conditions. These tests show that the reaction product has a 1-amino ketose rather than a 1-amino aldose structure. The strong levo rotation of the reaction product, in contrast to the strong dextro rotation of the starting material, also indicates isomerization from a dextrose radical to a levulose radical.

Example 7

Chelation of copper by each of di-α-D-glucosylamine, 1-amino-1-deoxy-D-fructose, and imino-bis(1-deoxy-D-fructose) in alkaline solution, but not in strongly acidic solution, is shown by the following results of qualitative tests:

| Action taken | Diglucosylamine | Acetate salt of 1-amino-1-deoxyfructose | Acetate salt of imino-bis(1-deoxyfructose) |
|---|---|---|---|
| $CuSO_4$ added to 0.1 M solution | pale blue | blue | green. |
| NaOH added to $CuSO_4$ solution | deeper blue | purple-blue, no ppt | deep blue, no ppt. |
| $NaHCO_3$ added to NaOH solution | no ppt | no ppt | no ppt. |
| $K_4Fe(CN)_6$ added to NaOH solution | no ppt | no ppt | no ppt. |
| HCl added to the above | red ppt. $Cu_2Fe(CN)_6$ | red ppt. $Cu_2Fe(CN)_6$ | red ppt. $Cu_2Fe(CN)_6$. |
| $CuSO_4$ added, acid soln. formed: | | | |
| $K_4Fe(CN)_6$ added to acid solution | red ppt. $Cu_2Fe(CN)_6$ | red ppt. $Cu_2Fe(CN)_6$ | red ppt. $Cu_2Fe(CN)_6$. |
| $NaHCO_3$ added to acid solution | $CuCO_3$ ppt | $CuCO_3$ ppt | $CuCO_3$ ppt. |
| NaOH added to the above solution containing $CuCO_3$ | $CuCO_3$ dissolves | $CuCO_3$ dissolves | $CuCO_3$ dissolves. |

The lack of precipitation of cupric hydroxide upon adding sodium hydroxide solution indicated chelation of the copper by the sugar derivative. Addition of carbonate or ferrocyanide, normal precipitants for copper, failed to produce a precipitate in alkaline solution. The cupric ferrocyanide and cupric carbonate precipitates that were formed in acid and in weakly alkaline solutions, respectively, were dissolved upon adding strong alkali.

Example 8

Extent of chelation of copper by the various sugar derivatives was measured quantitatively by titrating two-tenths of a millimole of the chelating agent in 5.00 ml. of 0.195 N sodium hydroxide solution with 0.195 N hydrochloric acid, with and without the addition of an equimolar amount of cupric sulfate. The pH was measured after each increment of acid addition, and pH values were plotted graphically vs. volume of acid solution added over the range from 12 to 2. Much less acid was required to reach a given pH when cupric ion was present, because the combining cupric ion released hydrogen ion (from the enolic or acid forms of the sugar derivative) equivalent to the amount of cupric ion chelated by the sugar derivative. From the differences in volume of acid added at the different pH levels, the weights of metal ion chelated were calculated. The results are tabulated below.

| pH | Grams of copper chelated per mole of sugar derivative | | | | |
|---|---|---|---|---|---|
| | Diglucosylamine | 1-Amino-1-deoxy-fructose acetate | Imino-bis (1-deoxy-fructose) acetate | Sodium gluconate | EDTA [1] |
| 4 | 0 | 3 | 5 | 5 | 62 |
| 5 | 0 | 9 | 12 | 13 | 62 |
| 6 | 31 | 53 | 65 | 41 | 54 |
| 7 | 58 | 84 | 70 | 47 | 39 |
| 8 | 58 | 87 | 71 | 48 | 36 |
| 9 | 60 | 73 | 73 | 53 | 33 |

[1] Ethylenediamine tetraacetic acid disodium salt dihydrate, recrystallized three times.

The results show that the sugar-ammonia derivatives are better chelating agents for copper in alkaline solutions than either of the two commercially used agents, sodium gluconate and EDTA.

Example 9

Extent of chelation of zinc was measured in the same way as for copper (Example 8) with an equimolar ratio of zinc sulfate to the chelating agent.

| pH | Grams of zinc chelated per mole of sugar derivative | | | | |
|---|---|---|---|---|---|
| | Diglucosylamine | 1-Amino-1-deoxy-fructose acetate | Imino-bis (1-deoxy-fructose) acetate | Sodium gluconate | EDTA [1] |
| 5 | 0 | 0 | 0 | 3 | 62 |
| 6 | 0 | 3 | 5 | 5 | 56 |
| 7 | 20 | 14 | 17 | 10 | 40 |
| 8 | 61 | 53 | 61 | 58 | 35 |
| 9 | 64 | 64 | 70 | 64 | 30 |
| 10 | 64 | 65 | 70 | 65 | 22 |

[1] Ethylenediamine tetraacetic acid disodium salt dihydrate, recrystallized.

The results show that the sugar derivatives chelate zinc to about the same extent in alkaline solution, and to a greater extent than EDTA at pH 8 and above.

Example 10

A standard procedure for determination of water hardness was applied to show sequestration of calcium and magnesium by diglycosylamine and imino-bis(1-deoxyfructose) acetate in tap water having a hardness equivalent to 400 p.p.m. calcium carbonate. Twenty ml. of tap water was titrated with a standard soap solution until a permanent lather was produced, with and without additive.

| Weight percent surface-active agent added | Milliters of standard soap solution required (1 ml.=1 mg. CaCO$_3$) | | |
|---|---|---|---|
| | Diglucosylamine | Imino-bis (1-deoxyfructose) acetate | Sodium gluconate |
| 0 | 8.0 | 8.0 | 8.0 |
| 0.1 | 7.0 | 6.5 | 6.7 |
| 0.5 | 6.5 | 5.5 | 6.0 |
| 1.0 | 6.0 | 4.5 | 5.0 |
| 2.0 | 5.5 | 3.5 | 4.0 |

The results show that imino-bis(1-deoxyfructose) acetate is a slightly better water-softener at pH 7 than the sodium gluconate standard. Di-α-D-glucosylamine shows a softening action that is less than that given by sodium gluconate under the same conditions.

Example 11

Chelation of calcium in strongly alkaline solution was demonstrated by measuring the drop in pH produced by adding 2.00 ml. of a neutral or weakly alkaline 0.1 M solution of the sugar derivative to 2.00 ml. of 0.01 M calcium hydroxide solution at pH 12.

| Additive, 2.00 ml. | Final pH | Drop in pH |
|---|---|---|
| Distilled water, pH 6.2 | 11.9 | 0.0 |
| Di-α-D-glucosylamine, 0.1 M, pH 7.3 | 11.5 | 0.4 |
| 1-Amino-1-deoxyfructose acetate salt, 0.1 M, adjusted to pH 7.0 with Ca(OH)$_2$ | 7.8 | 4.1 |
| Imino-bis(1-deoxyfructose) acetate salt, 0.1 M, adjusted to pH 7.0 with Ca(OH)$_2$ | 7.8 | 4.1 |
| Sodium gluconate, 0.1 M, pH 6.9 | 11.5 | 0.4 |

The results show that the two fructose derivatives chelate more strongly with calcium in highly alkaline solutions than do either di-α-D-glucosylamine or the commercially used sequestrant, sodium gluconate. Di-α-D-glucosylamine shows the same extent of chelation with calcium as does sodium gluconate.

Example 12

Chelation of ferric iron by sugar derivatives was measured at pH 7 by titrating a solution of potassium ferrocyanide with a solution of ferric sulfate until a permanent precipitate of ferric ferrocyanide was formed. Sodium hydroxide solution was added simultaneously to keep the pH at 7.0 throughout the titration. Two-tenths of a millimole of each sugar derivative was added. The ferric sulfate solution contained 2.5 mg. iron per ml., and 2.7 ml. was required for the blank titration.

| Sugar derivative added | Titer ml. | Net titer ml. |
|---|---|---|
| Di-α-D-glucosylamine | 3.1 | 0.4 |
| 1-Amino-1-deoxyfructose acetate salt | 5.8 | 3.1 |
| Imino-bis(1-deoxyfructose) acetate salt | 18.7 | 16.0 |
| Sodium gluconate | 20.7 | 18.0 |

The results show that di-α-D-glucosylamine does not form a stable chelate with ferric iron at pH 7. 1-amino-1-deoxyfructose acetate chelates weakly, while imino-bis(1-deoxyfructose) acetate chelates iron approximately as strongly as sodium gluconate at this pH.

Example 13

Imino-bis(1-deoxy-D-fructose) was prepared directly from glucose and ammonia and isolated as the crystalline acetate salt by the following procedure. Anhydrous methanol, 389 g. (500 ml.), was cooled to 0° C. Anhydrous ammonia gas was passed into the stirred methanol until the weight had increased to 504 g. (23% ammonia by weight). With continuous stirring of the methanol-ammonia at 0°–5° C., 1 mole of anhydrous D- glucose (180 g.) and 0.1 mole of ammonium chloride (5.4 g.) were dissolved in it within 15 minutes. Anhydrous sodium sulfate (100 g.) was added, and the mixture was stirred for 4 hours as it warmed to 23° C. The stirred mixture was then heated and refluxed at such a rate that the temperature remained below 40° C. for 3 hours, increased to 60° C. over the next hour, and remained at 60°–65° C. during the final hour of heating. The pale yellow methanol solution of the reaction products was filtered from the sodium sulfate while hot, and the filter cake was washed with two 100 ml. portions of boiling methanol. Removal of the methanol under reduced pressure in a rotating evaporator produced a white frothy residue of sirup which was dried under vacuum at 50° C. for 4 hours. Addition of glacial acetic acid (600 ml.) to the frothy residue caused immediate crystallization of D-glucosylamine acetate and di-D-glucosylamine acetate in equimolecular amounts. Analysis by acetylation as described above gave 0.90 g. (2.41 mmoles) of D-glucosylamine pentaacetate and 1.65 g. (2.44 mmoles) of di-D-glucosylamine octaacetate. Also, the nitrogen content of the dry mixture of crystals was 4.66 percent (calculated for an equimolar mixture: 4.68 percent nitrogen).

When the entire equimolar mixture of acetate salts of D-glucosylamine and di-D-glucosylamine was allowed to stand in glacial acetic acid for 6 hours at 25° C., one-third of the crystals dissolved, forming a red-orange solution. Filtration, followed by suspension of the filter cake in 200 ml. more acetic acid, with standing at 25° C. for 16 hours, produced a second soluble fraction and 105 g. of residual filter cake. Dilution of the combined acetic acid solutions with two volumes of ethyl acetate produced 69 g. of crystalline precipitate. Both fractions were washed repeatedly with ethyl acetate and ether until substantially free of acetic acid and then were dried under vacuum over sodium hydroxide. Both dried fractions were hygroscopic.

The 105 g. of acetic acid-insoluble fraction reduced 2,6-dichlorophenolindophenol extensively, but not instantly, in 0.1 N sodium hydroxide at 25° C. It chelated with copper strongly in alkaline solution so that cupric hydroxide was not precipitated. Paper chromatography showed this fraction to be mainly the acetate salt of 1-amino-1-deoxy-D-fructose admixed with acetate salts of D-glucosylamine and di-D-glucosylamine.

Analysis showed the 69 g. of acetic acid-soluble fraction to be nearly pure imino-bis(1-deoxy-D-fructose) acetate salt. Calculated for $C_{14}H_{26}NO_{12}$: 41.9% C, 6.78% H, 3.49% N. Found: 40.1% C, 6.48% H, 3.63% N. This fraction reduced 2,6-dichlorophenolindophenol instantly in 0.1 N sodium hydroxide solution at 25° C. and gave the same amounts of chelated copper as determined for pure imino-bis(1-deoxy-D-fructose) acetate in Example 8.

Having fully disclosed our invention, we claim:

1. A method of preparing a composition of matter having enhanced bivalent metal ion sequestration activity comprising dissolving glucose in a solvent member selected from the group consisting of a saturated solution of ammonia in methanol and cooled anhydrous liquid ammonia, said solvent members also containing an acid salt catalyst and an anhydrous sulfate salt, reacting at atmospheric pressure and at a temperature below about 40° C. for about 1–4 hours so as to retain ammonia, and then heating at about 60–70° C. at atmospheric pressure for about 1–4 hours to drive off substantially any remaining ammonia thus favoring the formation of di-D-glucosylamine molecules.

2. The method of sequestering metal ions selected from the group consisting of copper, iron, and zinc in alkaline to neutral solution and of softening calcium and magnesium-containing waters comprising the step of adding to said waters a member selected from the group consisting of imino-bis(1-deoxy-D-fructose), the acetate salt of imino-bis-1-deoxy-fructose, and mixtures comprising the same.

References Cited in the file of this patent

Isbell et al.: Reactions of the Glycosylamines, U.S. Atomic Energy Comm., December 1, 1957, N.B.S. 5325, 39 pages.